May 4, 1943.  W. H. WORTHINGTON  2,318,276
ENGINE LUBRICATING SYSTEM
Filed Nov. 10, 1939  2 Sheets-Sheet 1

INVENTOR:
Wayne H. Worthington
BY
ATTORNEYS.

May 4, 1943.   W. H. WORTHINGTON   2,318,276
ENGINE LUBRICATING SYSTEM
Filed Nov. 10, 1939   2 Sheets-Sheet 2

INVENTOR:
Wayne H. Worthington
BY
ATTORNEYS.

Patented May 4, 1943

2,318,276

UNITED STATES PATENT OFFICE 2,318,276

ENGINE LUBRICATING SYSTEM

Wayne H. Worthington, Waterloo, Iowa, assignor to John Deere Tractor Company, Waterloo, Iowa, a corporation of Iowa Application November 10, 1939, Serial No. 303,820

6 Claims. (Cl. 184—6)

The present invention relates to engine lubricating systems and has for its principal object the provision of an improved and more efficient pumping unit of the type adapted to be mounted inside the crank case of an engine. Heretofore it has been common practice to provide an oil pressure relief valve in connection with the discharge end of the oil pump, but the usual arrangement of such relief valves provides for discharging the excess oil directly into the body of oil in the crank case. The oil thus discharged from the relief valve is clean oil which has been filtered through at least the screen in the intake passage of the oil pump while a substantial portion of this oil has been pumped through the oil filter unit and is therefore practically free from dirt and other foreign particles. Discharging this clean oil into the crank case requires the oil pump to draw in an equal amount of oil from the main supply in the crank case and which is comparatively dirty oil, which must be cleaned and filtered before it is suitable to be pumped through the oil lines to the various bearings of the engine. It is therefore a more specific object of the present invention to increase the efficiency of the oil filtering and oil straining equipment by discharging the excess oil from the pressure relief valve directly to the inlet end of the oil pump, that is to say, to the inlet chamber of the pump inside of the oil strainer. Thus by recirculating the oil which has already been filtered and cleaned, it is not necessary to draw in as much oil from the main supply in the crank case.

A further object relates to the provision of more efficient means for supplying oil to those parts of the engine which require a comparatively small amount of oil. Instead of supplying oil to such parts through oil ducts of considerably smaller diameter which are subject to clogging, the present invention contemplates the use of full size oil ducts through which oil is pumped at full pressure but intermittently in metered quantities instead of in a constant flow. In the accomplishment of this object I have provided a distributing valve, by means of which each of the oil ducts to parts requiring only a limited amount, is subjected in turn to the full pressure of the oil pump.

Still another object relates to the provision of an oil basin around the lower portion of the pump drive gear which rotates about a vertical axis.

These and other objects will be apparent after a consideration of the following description, reference being had to the drawings appended hereto, in which.

Figure 1:
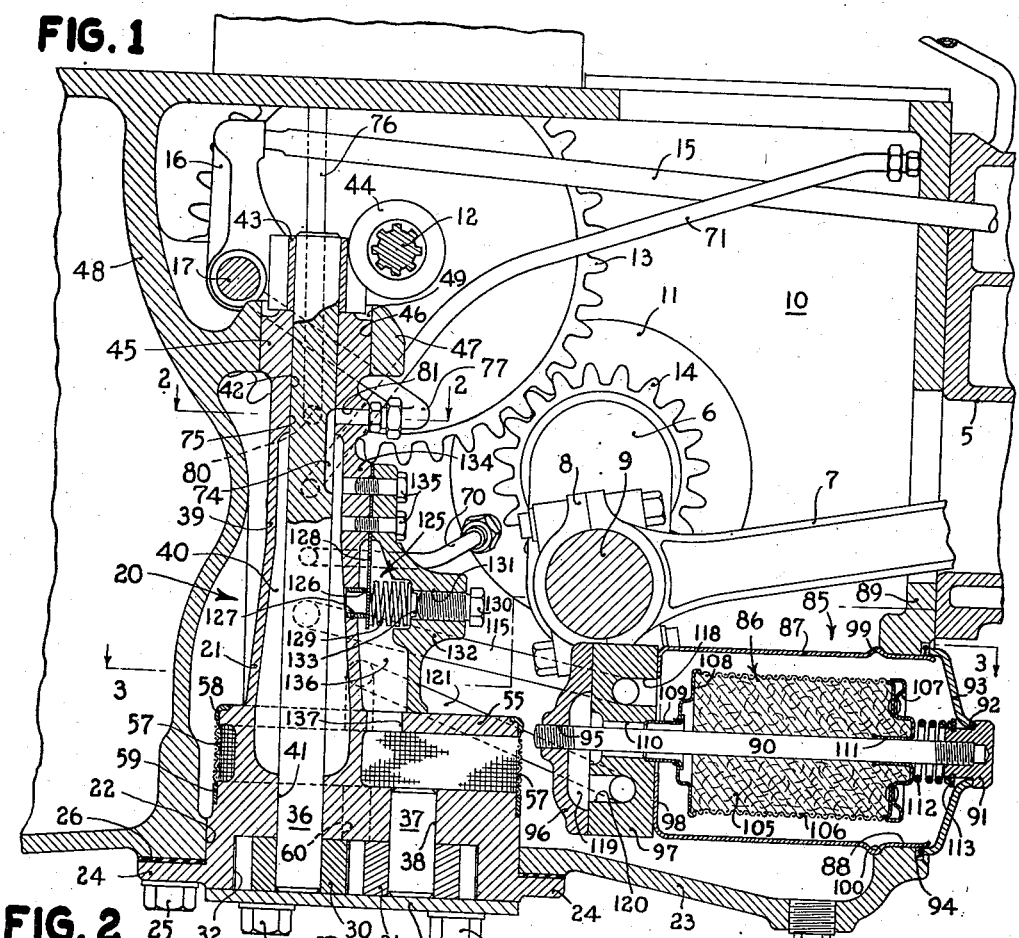
Figure 1 is an elevation in section taken along the line 1—1 in Figure 3 through the pumping and filtering units.

Referring now to the drawings, the engine used in the preferred embodiment of my invention is of the horizontal cylinder type, one of the cylinders being indicated by reference numeral 5, Figure 1, in which is reciprocated a piston (not shown) connected to a crank shaft 6 by a connecting rod 7, which includes a connecting rod bearing 8 embracing a crank 9 on the crank shaft 6. The crank shaft 6 is rotatably supported within the crank case, indicated by reference numeral 10, in main journal bearings, one of which is indicated at 11. A cam shaft 12 is journaled in suitable bearings (not shown) in the crank case adjacent the crank shaft 6 and is driven therefrom by means of a cam shaft gear 13 which meshes with a driving gear 14 on the crank shaft to drive the cam shaft at half speed, as is conventional in the four-cycle internal combustion engine. The tappet rods of the engine, one of which is indicated at 15, are each reciprocated in the usual manner by means of a tappet lever 16 supported on a rock shaft 17 within the crank case 10.

The lubricating system of the engine includes a pumping unit, indicated generally by the reference numeral 20, having a housing 21 which is adapted to be inserted through an aperture 22 in the bottom wall 23 of the crank case 10 and supported by means of a supporting flange 24, which is secured to the crank case by means of bolts 25. The housing of the pumping unit 20 fits snugly within the opening 22 and forms a closure therefor, and is sealed by suitable gasket means 26.

The oil pump is of the conventional gear type and comprises a pair of intermeshing gears 30, 31, which rotate within a gear chamber 32. This chamber is formed in the preferred embodiment by a recess in the lower end of the housing 21 which is closed by means of a bottom plate 33 secured tightly over the recess by means of bolts 34. The pump gears 30, 31 are rotated by means of a drive shaft 36 which is fixed to one of the gears 30, the other gear 31 being mounted on an idler shaft 37 journaled in a suitable bearing 38 in the housing 21.

The drive shaft 36 extends vertically upwardly through a second portion 39 of the housing 21. The housing portion 39 is in the form of a sleeve which defines a high pressure reservoir 40 around the drive shaft 36. The reservoir 40 is closed at its lower end by the journal bearing 41 in which the drive shaft 36 is journaled, and at the upper end thereof by a second journal bearing 42 which closely embraces and supports the upper end of the drive shaft 36. The driving gear 43 is fixed to the top end of the drive shaft 36 outside the housing portion 39 and meshes with a driving worm 44 which is fixed to the cam shaft 12. The upper end of the housing portion 39 is formed with a cylindrical supporting boss 45 which is slidably received within a recess preferably in the form of a cylindrical bore 46 in an annular support 47 preferably made as an integral part of one of the inner walls 48 of the crank case 10. By means of this support 47 the gear 43 is maintained in proper meshing relation with the worm 44. It will be noted that the upper drive shaft bearing 42 is lubricated by oil under pressure from the high pressure reservoir 40 and some of the oil that is forced through the journal bearing 42 is retained in a basin 49 about the lower portion of the gear 43 for the purpose of lubricating the gears 43, 44. The basin 49 is formed by cutting back the upper surface of the housing portion 39 to form a depression under the gear 43, and by extending the annular supporting member 47 upwardly beyond the lower edge of the gear 43, as indicated in Figure 1.

The pump housing is provided with a disc-shaped deck 55 disposed horizontally and spaced vertically from the portion of the housing containing the pump chamber 32, to provide an inlet chamber 56. Since the deck portion 55 is supported on the vertical sleeve-like portion 39 of the housing as an integral part thereof, the inlet chamber 56 is open to the crank case around its entire circumference. This opening between the inlet chamber and the crank case is protected by a screen 57 which is secured above and below the opening by metal bands 58, 59, respectively. An intake passage 60 extends downwardly from the inlet chamber 56 to the pump chamber 32 and supplies oil to the intake side of the gear pump. A discharge passage 61 extends upwardly from the discharge end of the pump and is connected by means of a suitable fitting 62 to a discharge duct 63 which is connected to the high pressure oil chamber 40 by means of an elbow fitting 64.

Figure 2:
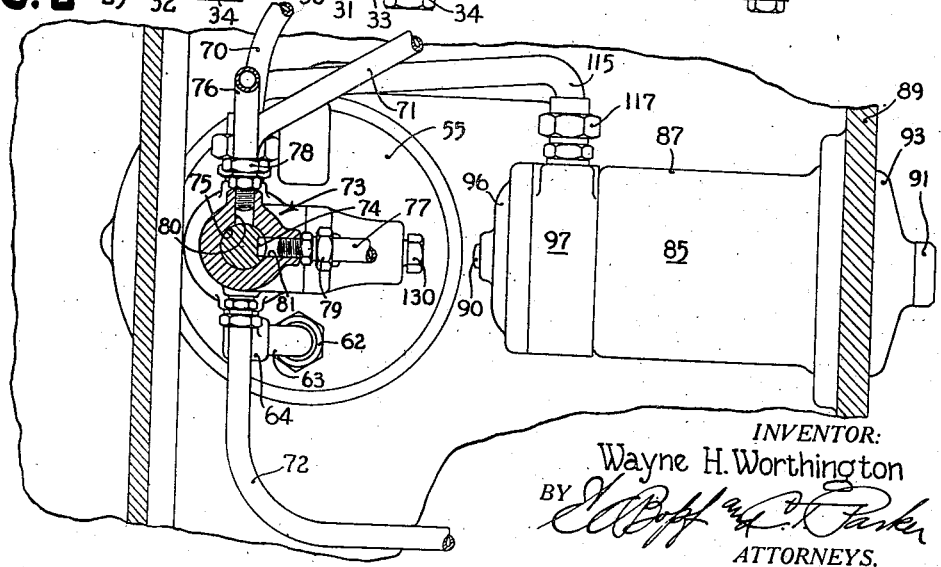
Figure 2 is a sectional plan view taken along a line 2—2 in Figure 1.

Connected at various points to the high pressure oil reservoir are oil ducts which conduct oil under pressure to various parts of the engine. For example, the main bearing 11 is lubricated by a constant flow of oil from the high pressure reservoir to an oil duct 70. Another oil duct 71 extends from the high pressure reservoir to the oil gauge to indicate the pressure in the reservoir. A third oil duct 72 supplies oil to another main bearing (see Figure 2).

Certain other parts of the engine which do not require lubricating oil in large quantities, are supplied from a distributing valve indicated generally by reference numeral 73 which meters the oil to the last named bearings in intermittent impulses. The distributing valve 73 comprises a groove 74 extending axially along the drive shaft 36 from the high pressure oil reservoir 40, to a point within a collar portion 75 within the upper end of the housing portion 39 and preferably formed as an integral portion of the journal bearing 42, as indicated in Figure 1. As the drive shaft 36 is rotated, the upper or discharge end of the slot 74 is moved into and out of register with each of a number of ports in the collar 75. A plurality of oil ducts 76, 77 are connected by suitable fittings 78, 79 to passages 80, 81 which terminate at the above-mentioned ports, respectively. In the present embodiment the duct 76 extends to the engine governor and duct 77 extends to the tappet levers for the inlet valves. By supplying such parts with oil at intermittent intervals, the total amount of oil that is necessary to be handled by the pump is reduced and therefore the size of the pump and filter unit can be held to a minimum.

An oil filter unit 85 is mounted in the crank case 10 adjacent the pumping unit 20 and comprises a filter cartridge 86 mounted within a tubular housing 87. The outer end of the housing 87 is pressed snugly into a circular opening 88 in the end wall 89 of the crank case and is normally retained therein by means of a threaded rod 90 which is disposed along the center line of the housing and filter unit and has a nut 91 threaded on its outer end. The nut 91 is provided with a shoulder 92 which engages an end shield 93 and secures the latter in engagement with the outer surface of the end wall 89 around the opening 88. An annular gasket 94 seals the edge of the shield in oil-tight relation. The inner end of the securing rod 90 is received in a threaded aperture 95 in an inner end shield 96 which is drawn up tightly in clamping relation against a head 97, retaining the latter securely against the end 98 of the housing 87. When the nut 91 is tightened, the reaction is taken against a ridge 99 pressed into the housing 87 and which seats firmly into a recess 100 formed around the inner end of the opening 88 in the end wall of the crank case.

The filter cartridge 86 is of more or less conventional construction and comprises a mass of fibrous filtering material 105 confined within a cylindrical screen 106 which is supported between a pair of end plates 107, 108. The inner end plate 108 is fixed to a supporting thimble 109 which encircles the securing rod 90 and seats within a central aperture 110 in the head 97. The outer end plate 107 is provided with a tubular supporting portion 111 which embraces the rod 90 and centers the end plate on the rod and is slidable thereon. A coil spring 112 maintains a pressure against the end plate 107 to hold the filter cartridge in position with the thimble 109 seated in the passage 110. The spring 112 reacts against a stop 113 on the nut 91. Oil is pumped into the filter unit 87 through an oil duct 115, which is connected by means of a fitting 116 to the tubular housing portion 39 in communication with the high pressure reservoir 40, and to the head 97 by means of a fitting 117. A passage 118 in the head 97 connects the oil duct 115 with the interior of the filter housing 87. The oil is forced from all sides through the screen 106 and through the filter material 105, leaving the filter cartridge through the thimble 109 and the passage 110 in the head 97. The inner end shield 96 is concave to provide a passage 119 which communicates with a passage 120 in the head 97 through which the oil leaves the filter unit. The clean oil flows back to the pumping unit through a duct 121 which is connected by an angle fitting 122 in communication with the inlet chamber 56 of the pumping unit.

Figure 3:
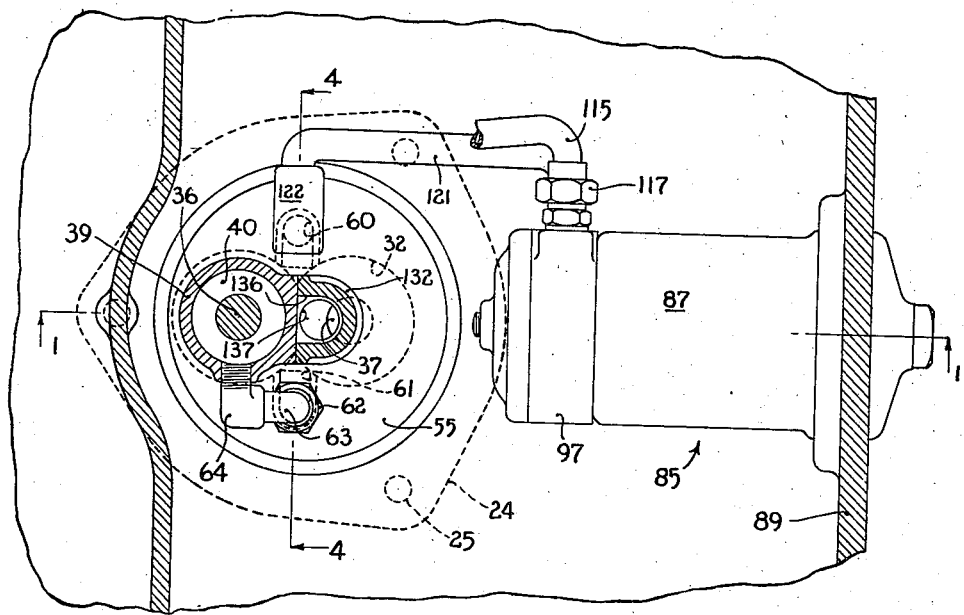
Figure 3 is another sectional plan view taken along a line 3—3 in Figure 1.
Figure 4:
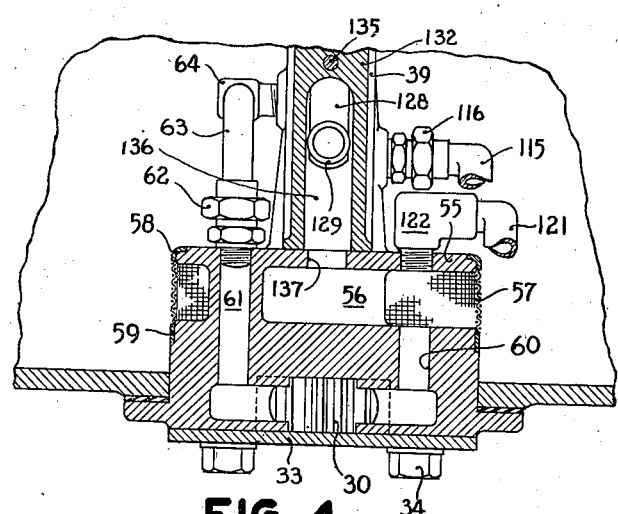
Figure 4 is a sectional elevational view taken along a line 4—4 in Figure 3.

In order to insure that full pressure is always maintained in the high pressure reservoir 40, regardless of variations in the tightness of the various bearings due to progressive wear thereof, the pump is designed to normally deliver an excess amount of oil to the high pressure reservoir 40, and then any excess of oil over the amount required by the bearings is discharged through an excess pressure relief valve, indicated generally by reference numeral 125, comprising a cylindrical valve seat 126 which is fastened tightly into a port 127 in the tubular housing portion 39, and a leaf spring valve member 128 which covers the opening in the valve seat 126 and is held thereagainst by means of a coil spring 129, the pressure of which is adjustable by means of a set screw 130. The set screw 130 is supported in a threaded aperture 131 in a housing member 132 and bears against a thrust washer 133 on the outer end of the coil spring 129. The leaf spring 128 is fastened between the upper end of the housing member 132 and a boss 134 on the housing portion 39, by means of a pair of bolts 135 which are inserted through aligned apertures in the housing member 132 and the leaf spring 128 and are engaged in threaded apertures in the boss 134. Thus it is evident that the set screw 130 can be adjusted to hold the leaf spring 128 against the valve seat 126 with a predetermined pressure whereby any excess oil pumped into the reservoir 40 will increase the pressure in the reservoir and cause the leaf spring 128 to be forced away from the valve seat 126, allowing the excess oil to flow out of the valve. Since the oil thus discharged is clean oil that has been filtered at least through the screen 57, it is desirable to recirculate this excess oil rather than to discharge it to the main body of oil in the crank case. For this reason the housing member 132 is formed with a U-shaped cross section to provide an enclosure for the discharge valve and a return passage 136 which communicates at its lower end with an opening 137 in the top of the inlet chamber 56. The sides and bottom of the housing member 132 are held tightly against the sides of the housing portion 39 and the top of the deck 55, respectively, to exclude the unfiltered oil in the crank case (see Figures 3 and 4). Thus it is evident that the amount of oil discharged through the pressure relief valve 125 does not increase the capacity requirements of the filter screen 57 and the filter unit 85.

It is believed that the operation of the lubricating system as a whole has been made clear to those skilled in the art by the description of the various parts of the system. I do not intend my invention to be limited to the exact details disclosed herein, except as set forth in the claims which follow.

1. In an engine lubricating system, an oil supply reservoir, an oil pump having a discharge passage, an oil inlet chamber mounted near the bottom of said reservoir, said pump having an intake passage in communication with said chamber and the latter having an opening to receive oil from said reservoir, a screen in said opening to exclude foreign particles from said chamber, an oil filter unit, duct means between said filter unit and said pump discharge passage for conducting oil under pressure to said unit, duct means between said filter unit and said chamber to conduct filtered oil directly thereto, and an excess pressure relief valve connected to said pump discharge passage, said valve being connected directly with said inlet chamber whereby oil discharged from said relief valve is recirculated directly through said pump to reduce the amount of oil drawn through said screen from said supply reservoir.

2. In a lubricating system for an engine having a crank case, an oil pumping unit comprising a housing, pumping means disposed within said housing, the latter having a generally tubular portion serving as a high pressure reservoir for said pumping means, a drive shaft connected to said pumping means and extending through said reservoir portion of said housing, a bearing at the outer end of the latter in which said shaft is journaled, and a drive gear fixed to said shaft outside of said housing, said housing being adapted to be inserted through an opening in the bottom of said crank case and extending upwardly therefrom in a position in which said drive shaft is vertically disposed with said gear at the upper end and having flange means outside the crank case for supporting the housing in the crank case opening to form a closure therefor, an annular supporting member fixed within said crank case and having an opening therein to slidably receive the upper end of said pumping unit adjacent said drive gear, said supporting member being disposed to extend above the upper end of said housing to form an oil basin around the lower edge of said driving gear, whereby oil forced through said bearing means is retained in said basin to lubricate said gear and to be thrown thereby to surrounding parts.

3. In an engine lubricating system, a pump comprising a pair of meshing gears, a casing therefor, a deck spaced above said casing forming an inlet chamber for said pump therebetween, a drive shaft connected to one of said gears and extending out of said casing through said deck and journaled in a bearing spaced above said deck, an enclosure for said shaft between said casing and said bearing serving as a high pressure oil reservoir connected to the discharge end of said pump, there being an aperture in the side of said shaft enclosure, a relief valve biased to close said aperture, and a housing part having an open recess, the sides of which fit against the outer side of said enclosure to enclose said valve and abutting against said deck, there being an aperture in the latter within the recess in said housing part whereby the latter serves as a duct for returning oil from said valve to said inlet chamber.

4. In an engine lubricating system, a pump, a housing therefor, means defining an inlet chamber and a high pressure reservoir in said housing, said reservoir and said inlet chamber each having an aperture in the side thereof, a detachable housing part secured to said pump housing and cooperating with the outer side of the housing to define therebetween a by-pass passage between said apertures, and a spring biased valve for closing the aperture in said reservoir, said valve being supported on said detachable housing part.

5. In an engine lubricating system, a pump, a housing therefor, means defining an inlet chamber and a high pressure reservoir in said housing, said reservoir and said inlet chamber each having an aperture in the side thereof, a detachable housing part secured to said pump housing and having an open recess cooperating with the outer side of the housing to define therebetween a by-pass passage between said apertures, a valve for closing the aperture in said reservoir, spring means for holding said valve closed, and adjusting means carried on said housing part for adjusting the pressure of said spring.

6. In an engine lubricating system, a pump, a housing therefor, means defining an inlet chamber and a high pressure reservoir in said housing, said reservoir and said inlet chamber each having an aperture in the side thereof, a detachable housing part secured to said pump housing and cooperating with the outer side of the housing to define therebetween a by-pass passage between said apertures, a valve comprising a leaf spring clamped between said housing part and said reservoir for covering said aperture in the reservoir, and a coil spring carried by said housing part for yieldingly holding said valve closed.

WAYNE H. WORTHINGTON.